July 1, 1952 A. N. GOLDSMITH 2,602,016

SENSITIZING, RECORDING, AND DESENSITIZING APPARATUS

Filed March 26, 1946 2 SHEETS—SHEET 1

INVENTOR
Alfred N. Goldsmith
BY H. S. Grover.
ATTORNEY

INVENTOR
Alfred N. Goldsmith
BY
H. S. Grover
ATTORNEY

Patented July 1, 1952 2,602,016

UNITED STATES PATENT OFFICE 2,602,016

SENSITIZING, RECORDING AND DESENSITIZING APPARATUS

Alfred N. Goldsmith, New York, N. Y., assignor to Radio Corporation of America, a corporation of Delaware Application March 26, 1946, Serial No. 657,162

13 Claims. (Cl. 346—76)

The present invention relates to methods of and means for facilitating the electrical production of marks visible on a recording surface, and, more particularly, although not necessarily exclusively, to novel methods of and apparatus for conditioning or sensitizing a recording medium; or for producing electrical conductivity in a carrier for a recording medium, the recording medium itself, or both. It also relates to apparatus and methods for utilizing the thus created conductivity of the surface to produce electrically or otherwise marks of a desired character. A member which exhibits a visible mark or series of marks on its surface as a result of a recording operation will be referred to generally as a "record receiving member." It is stressed that any forms of sensitization and of marking which result from the utilization of the methods herein disclosed are intended to fall within its scope, which scope is not restricted to the exemplary forms of sensitization and marking herein shown.

In accordance with the invention, the sensitizing or conditioning effect is sharply confined locally to the point at which the actual recording takes place or in a region closely adjacent thereto. Also, preferably, restoration of the record receiving medium to its original state occurs immediately or very shortly after recording in a sharply localized or elemental area. The record receiving medium referred to previously and to which the invention applies may be in the form of a sheet or web treated so as to change color upon passage of an electric current through it upon sensitization. Production of the mark may, in some instances of the application of this invention, depend upon producing electrical conductivity by introducing moisture into the medium and then passing an electric current through the conductive medium to produce the mark electrolytically. The above mentioned carrier of the record receiving medium may be a web or sheet of fibrous material coated or impregnated with a record receiving medium. The invention may be applied where this is the case by sensitizing the record receiving medium, or by imparting conductivity locally to the carrier of the record receiving medium, or by a combination of both of these effects. In an extreme case, the invention may be applied to bringing a sensitizing fluid, such as a vapor, into contact with a more or less limited but constantly changing area of the recording sheet and subsequently eliminating the sensitization so that a further and possibly different recording process may be carried out on the same sheet by using a different sensitizing substance or fluid, if desired.

Stated briefly, the invention contemplates producing extremely minute-area sensitization immediately ahead of the recording "point" or elemental area and producing or obtaining extremely localized and substantially complete desensitization immediately after the minute sensitized area passes the recording point. In accordance with the invention, means are provided for carrying out the foregoing steps at extremely high speeds. The localized character of the sensitization and desensitization in accordance with the invention produces the result that the record receiving medium, the carrier, or the record receiving member generally will effectively maintain its original strength and resistance to tearing throughout the entire recording region. It will be noted, for example, that if moist sensitization is used, the weakened moist areas will be minute and surrounded by dry and structurally strong adjacent areas, whereby distortion or tearing of the record receiving medium are avoided. This process thus enables the record receiving member, usually in the form of a paper sheet or web, to resist stresses imposed upon it during a recording operation, particularly at extremely high recording speeds.

The principal object of the invention is to provide methods of and apparatus for sensitizing and subsequently desensitizing a record receiving member at high speeds and in sharply localized areas.

Another object is to provide for extremely minute-area sensitization of a record receiving member immediately ahead of the "recording point" or area in a recorder, an extremely localized and corresponding desensitization immediately following the recording area.

Still another object is to provide novel moistening means for moistening or dampening an elemental area of a record receiving member in the direction of scanning of the member to facilitate the production of marks at the speed of scanning.

A further object is to provide novel arrangements for moistening a record receiving member to produce electrical conductivity without weakening the member or permitting it to become generally moist, and without substantially distorting the sensitized area or adjacent areas thereto.

A still further object of the invention is to provide an electrical recorder having novel means for sensitizing and desensitizing a record receiving member.

A still further object is to provide an electrical recorder of the helix type having means to sensitize and desensitize a record receiving member closely adjacent to the travelling active point on the helix.

Other and more specific objects of the invention will become apparent from a consideration of the following specification and claims in connection with the accompanying drawings illustrating two embodiments of the invention, in which:

Figures 1, 2:
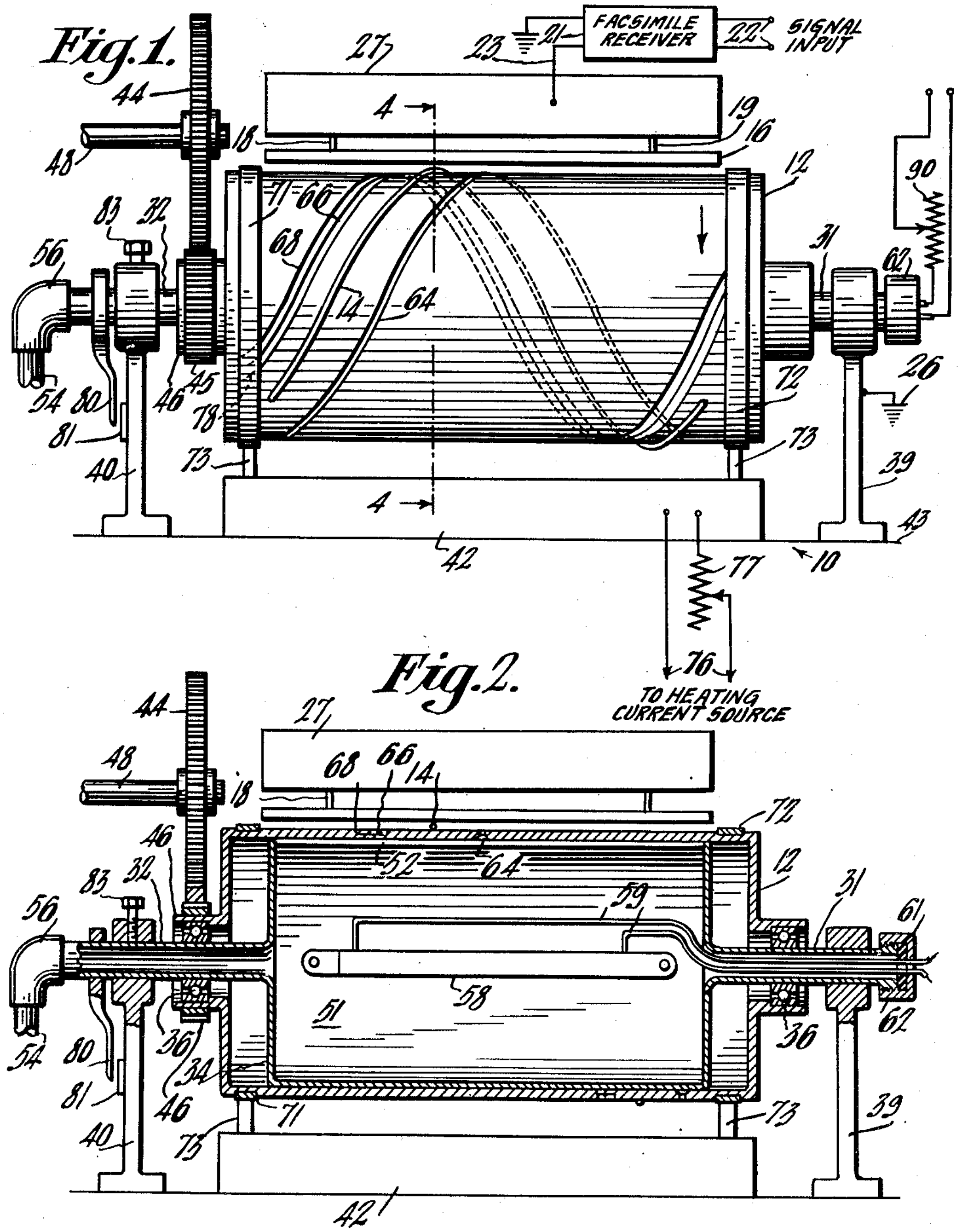
Fig. 1 is a view in front elevation of a facsimile recorder embodying the invention.
Fig. 2 is an elevational view, partially in section on line 2—2 of Fig. 3.

Referring for the present to Fig. 1 of the drawings, there is shown, by way of example, a recording machine, indicated in its entirety by reference character 10, which is suitable for producing marks in accordance with facsimile signals. The machine 10 is generally of the character described in United States Patent No. 2,215,806, granted to C. J. Young, September 24, 1940. By reason of the invention disclosed herein a considerable improvement in the method of recording and in the apparatus which embodies features for carrying out the improved method is presented over the general disclosure of the Young patent and other patents showing prior art recording devices.

The machine 10 comprises a recording drum member 12 provided with a radially projecting helical electrode 14 mounted on its periphery which cooperates with a second electrode in the form of a printer bar member 16. The printer bar 16 is or may be carried by a light pressure producing means (not shown) which reacts on movable supports 18 and 19. Reference character 21 designates a signal or facsimile receiver of any known type which is in communication with a signal input source 22. Signals suitable for recording are applied to the recording electrodes from the receiver 21 over a connection 23. The frame of the machine 10 is or may be grounded as indicated at 26 to complete the connection to the recording electrodes. The helix 14 is therefore ultimately to be connected to a stationary metallic part of the machine 10. The mechanical connections for the printer bar supports 18 and 19 may be located within a casing 27 supported in any suitable manner. Since the elements so far described are well known per se and generally of themselves do not form the particular basis of this invention, they are illustrated herein more or less diagrammatically. Further details of a helical recorder with respect to paper feed means and other conventional features are to be found in United States Reissue Patent No. Re. 20,152, granted to C. J. Young on October 27, 1936. The recorder in this last named patent, however, relies on a transfer of marking material to produce marks by a vibrating printer bar, rather than on electrolytic or other processes which depend upon a direct application of electrical effects to the record receiving member.

A record receiving member in the form of a sheet or web 28 (Fig. 4) passes between the printer bar 16 and the drum 12 so as to have a substantially tangential contact with the helix 14. The printer bar 16 bears upon one surface of the sheet 28 with the pressure applied to the supports 18 and 19. Record receiving members will be discussed more in detail hereinafter in connection with the novel methods of the present invention and the operation of the machine 10 which includes distinctive features in accordance with the invention.

Figures 3, 4, 5:
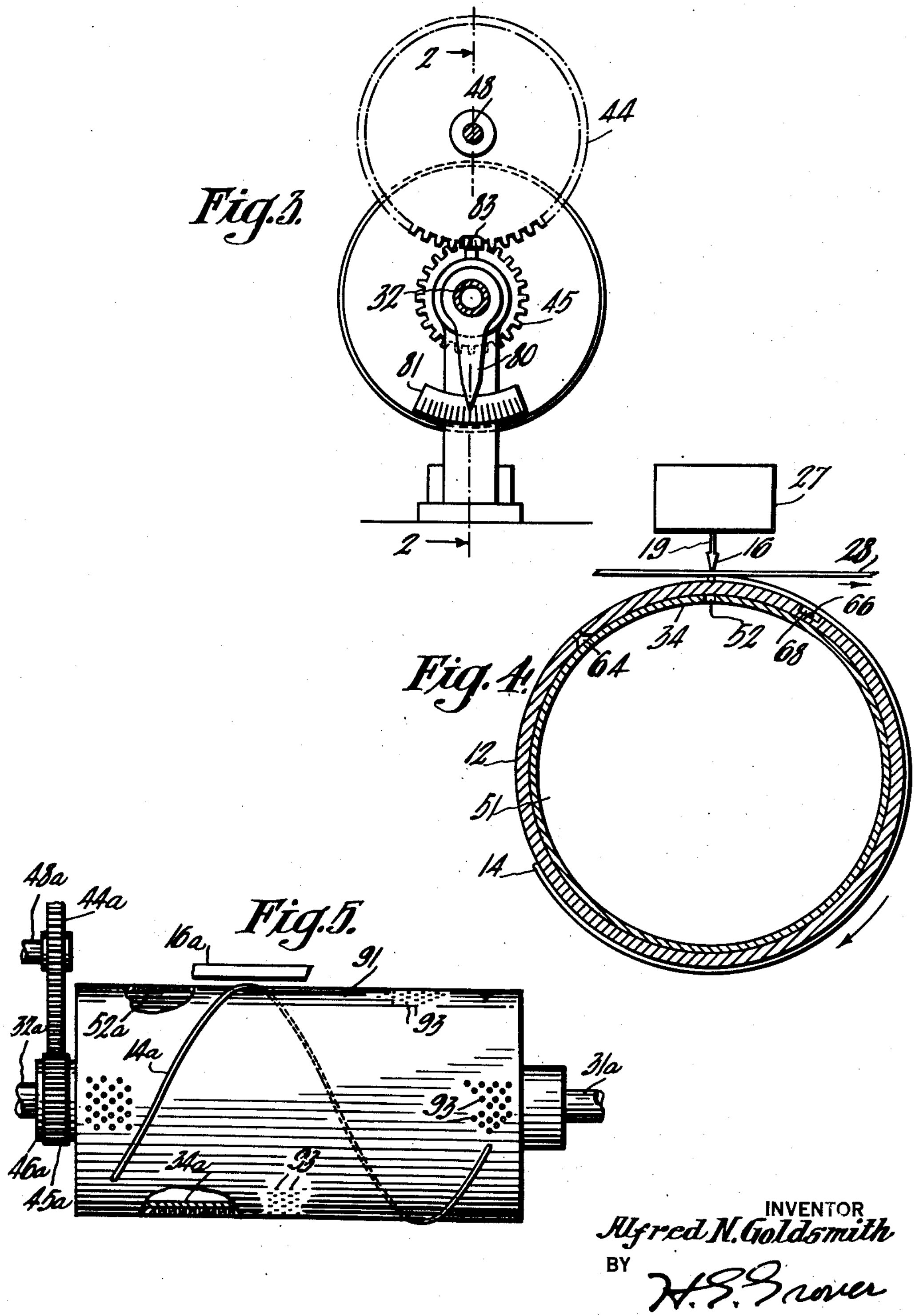
Fig. 3 is a fragmentary view taken from the left hand side of Fig. 1.
Fig. 4 is a fragmentary elevational view, partially in section on line 4—4 of Fig. 1.
Fig. 5 is a fragmentary elevational view showing a modification of the invention.

The drum 12 is rotatably supported by bearing means on shafts 31 and 32 which serve to support the inner cylinder 34 (Figs. 2 and 4). The bearing means just mentioned are shown by way of example as combined radial and thrust anti-friction bearings 36. The shafts 31 and 32 are mounted for at least limited rotation in apertures in a pair of supporting members 39 and 40 respectively. These supporting members and a housing 42 for the electrical connections to be described hereinafter may conveniently be mounted on a base member or other fixed support 43.

Rotation for scanning purposes is imparted from a gear 44 to the drum 12 through a pinion 45 secured to or formed integrally with one hub 46 of the drum 12. The gear 44 may be driven from a shaft 48 which is operatively connected to any suitable source of mechanical power synchronized with a more or less remote signal generator, for example, a scanner of a facsimile transmitter. It will be understood by those skilled in the art that the rotational speed of the drum 12 is correlated with the speed of travel of the sheet 28 in a manner to obtain scanning, the means of so doing being well known in the art.

The inner cylinder 34 is hollow as shown so that it includes a cavity 51 (Figs. 2 and 4) and its outer periphery has a longitudinal slot parallel to the axis of the said cylinder and indicated by reference character 52. The slot 52 is preferably quite narrow and in effect it may be comparable in width to the width of the extremely narrow scanning line which is traced on the sheet 28 at the moving point of contact between the helical electrode 14 and the printer bar 16. The previously mentioned shaft 32 is in the form of a conduit so that it may be placed in communication with another conduit 54 by suitable coupling means 56. The conduit 54 communicates with a source of fluid which is to be introduced into the cavity 51 of the cylinder 34. The fluid may, depending on the intended use of the machine 10, be a liquid or a vapor, heated or at a normal temperature. If a liquid is supplied to the cavity 51 it may be converted into vapor by means of a heater 58 or a number of such heaters, if desired. The heater 58 may be of the electrical immersion type fed by conductors 59 (Fig. 2) which pass through a sealing gasket 61 secured over the end of the hollow shaft 31 by an open-ended pipe cap or the like 62.

The drum 12 is preferably formed of electrical insulating material which is resistant to heat and is provided with a preferably narrow helical slot 64 spaced suitably from the helix 14. The external longitudinal helical opening or elongated orifice of the slot 64 is comparable in width to the width of the slot 52 so that a very fine opening which travels in the direction of the length of a scanning line is provided. The phase of the helical slot 64 in the drum 12 is such that the jet of fluid, heated vapor for example, impinges upon the sheet 28 sufficiently ahead of the recording area or point and on a minute area of the sheet to produce sensitization in this minute area. The slot indicated at 64 may be replaced by a succession of minute closely adjacent orifices. These orifices may be circular or elongated.

The direction of rotation of the drum 12 is indicated on Figs. 1 and 4 of the drawings whereby the traveling minute sensitizing area and the traveling scanning spot or elemental recording area follow each other across the sheet 28. Direction of movement of the paper 28 is also indicated, but this is optional. In general, the usual procedures may be followed in designing a helical recorder with respect to design, mounting, and insulation of the helix, and the design and mounting of the printer bar. The design of the drum 12 will depart from that of prior art recorders to permit an operation in conjunction with the inner member, for example the cylinder 34, which presents the linear slit 52 for cooperation with the helical slot 64 to provide what in effect is a capillary nozzle traveling recurrently and synchronously with the scanning point and at a high speed. The term "nozzle," as used herein, refers to a small aperture having linear extension, through which a fluid may guidedly pass. The drum 12 may be constructed of the usual materials. If it is of insulating material, as suggested above, the problem of insulating the helix and other electrical appliances yet to be described will be simplified.

The extremely localized desensitizing, which is to occur immediately after recording in progressive elemental areas, as recording progresses at high speeds, is provided by a resistance wire 66 wound as a helix around the recording drum 12. Usually, a one-turn helix will be sufficient. The wire helix 66 may be recessed in a helical groove 68 in the drum so as to prevent direct contact with the surface of the record sheet when this is desirable. This arrangement as shown in the drawings provides, a radiative recessed heater. The heating effect of the wire helix on the sheet 28 is reasonably confined, but in general not so sharply as the effect of the sensitizing means. If the drum 12 is of electrically conducting material, the groove 68 may be lined with electrical and heat insulating material. The latter property of the lining will retard escape of heat into the body of the drum.

The wire helix 66 is slightly backed in phase relative to the recording helix 14. The ends of the wire helix 66 are connected to slip rings 71 and 72 adjacent each end of the drum 12. Brushes 73 provide a connection from the slip rings through suitable wiring (not shown) to the terminal leads 76 which may be connected to a suitable heating current source such as the secondary of a normal step-down transformer. The connection to the heating current source may comprise heat regulating means such as the rheostat 77. The slip rings 71 and 72 will require underlying insulating material if the drum 12 is conductive. A convenient means of connecting the ends of the wire helix 66 to the slip rings is shown in Fig. 1 at the groove ends 78. The groove is shown as being continued under the rings so that each wire end may be connected to its ring or to a small inward projection on the ring.

It may be noted at this point that tension of the sheet or web as it moves through the recording zone is limited only by the strength of the sheet in its substantially dry state or with its usual moisture content. This is because that instead of moistening or otherwise treating successive sections of the sheet in the direction of its full width only a relatively minute section of its length is acted upon by the jet. The result is that a treated rectangle having a length roughly equal to the distance between the slot 64 and the wire helix 66, as measured along an element of the drum 12, is in recording condition at any given instant and this rectangle moves at high velocity across the width of the sheet 28. The overall tensile strength of the web is thus substantially unchanged. It follows that sheet weakening or distortion are avoided. Where recording is to be effected between margins, the slit 64 will be some fraction of the full pitch. The sheet edges where tearing usually starts thus will remain untreated and will not be weakened. Controlled width treating is therefore one significant feature of this invention in the form being discussed and in the modification of Fig. 5 to be described.

Control of the point of impingement of the jet on the sheet 28 with respect to the point of intersection of the helix electrode 14 and the printer bar 16 may be obtained by varying the angular position of the inner cylinder 34. Preferably, the slot 52 will be substantially in register with the printer bar 16, or it may be located slightly in advance of the printer bar with respect to sheet travel.

To permit adjustment of the slot 52, the shafts 31 and 32 are, as previously stated, rotatably mounted in the supports 39 and 40. The angular position of the slot 52, which is concealed in the the drum 12, is conveniently indicated by a pointer 80 and a scale-plate 81. Adjustment is maintained by a set-screw 83. Adjustment of the angular position of the slot 52 will not be critical except where recording is to occur at extremely high speeds and where sensitization of the record receiving medium must be confined briefly to an extremely small area because of involving a more complex action than merely moistening the sheet 28. For example, certain materials, which exhibit a color change under the influence of electrical effects, require fuming with a vapor or vapors of special chemical substances. Where such vapor is to be applied, the definition of the nozzle size will preferably approach the recording spot size which is a measure of the degree of resolution of the produced image.

The general method involving the present invention will first be discussed in connection with a record sheet 28 in its simplest form. Also in describing the general method of recording, the mode of operation of the machine 10 will be referred to, where necessary, so that a complete description of the operation of the machine 10 will be given. It will be assumed that the sheet 28 is of moisture absorbing fibrous material such as paper and that it is impregnated or otherwise supplied with a color changing substance, for example, of the type disclosed in U. S. Patent No. 2,306,471 to Myer Solomon, granted December 29, 1942. Such a record receiving member or record sheet requires only that it be moist to impart electrical conductivity when recording occurs. Heretofore in the prior art a liquid was applied to the record sheet thereby weakening it generally so that it required special paper handling devices such as squeegees, doctor blades and the like to guard against both distortion and tearing. After drying, such sheets are no longer flat and undistorted. By the method of the present invention as stated above dampening of the paper, which in the simple form of recording under consideration produces conductivity by applying moisture, is confined to a localized area. In accordance with the invention the moisture is driven from this localized area almost immediately so that at a given instant only a minute fraction of the width of the paper is moist at any one time. This may be accomplished in the machine 10, for example, by placing the conduit 54 in communication with a water supply and so arranging that only sufficient water is provided at a time partly to fill the cavity 51 of the inner cylinder 34. The heater or heaters 58 convert this water to steam, the degree of steam pressure being regulated by the amount of heat supplied. A regulating means is indicated by reference character 90. Since the time of application of the vapor, steam in this instance, is very brief, a high pressure will be necessary to produce substantially instantaneous conductivity. The steam is projected through the small orifice provided at the intersection of the helical slot 64 in the drum 12 with the slit 52 in the cylinder 34. This orifice traverses the width of the sheet 28 just ahead of the scanning point at the intersection of the helix 14 with the printer bar 16. Immediately thereafter and following elemental area recording the minute moistened area is dried by exposure to the wire helix 66. The degree of drying is or may be regulated in accordance with ambient moisture conditions so that the sheet 28 is not desiccated whereby the sheet is left with its original moisture content thus minimizing any tendency toward localized distortion. Where atmospheric conditions are extremely dry then the progressively moistened spot on the sheet 28 may be almost completely dried without causing sufficient distortion in the printing area to be troublesome. In the electrolytic recording process just discussed by way of example, the angular position of the slit 52 is not extremely critical.

Some record receiving members are in the form of a paper sheet coated with a color changing material, the latter not requiring treatment. The member as a whole requires moistening to produce conductivity in the body of the paper sheet. Methods and apparatus involving features disclosed herein are quite effective in obtaining records with recording sheets of this type, by following substantially the procedure outlined above.

Recording may be carried out in accordance with the present invention by limiting the volume of the cavity 51 while maintaining the physical dimensions of the slit 52 and placing the conduit 54 in communication with a source of steam under presure such as a flash boiler or the like. When the machine 10 is operated in this manner, the heater 58 will be unnecessary but may be retained to prevent condensation of the steam and accumulation of water in the cavity 51.

It will be noted that the organization of the parts of the machine 10 is such that the conductive printer bar 16 is shielded from the jet of fluid thereby eliminating trouble caused by condensation of moisture on this bar. Heretofore, it has been necessary at times to heat the bar 16 to prevent condensation of moisture and to evaporate liquid accumulated by the scraping of the bar over paper which is wetted throughout a considerable area in accordance with prior art practices.

The machine 10 may be operated in accordance with the invention by placing the conduit 54 in communication with a source of liquid so that liquid is projected continuously through the traveling orifice which in this instance would be of minute or capillary dimensions so as to avoid application of an excess of liquid. With extremely high speed recording, this mode of operation is quite feasible inasmuch as successive areas of the sheet would be wetted by only a small quanity of liquid.

The sheet 28 may be of any kind coated or impregnated with a color changing substance, this substance requiring sensitization by the application of special vapor or a gas thereto. In this instance desensitization may be unnecessary. Ammonia vapor, such as in the ozalid process, is an example of a special fluid. Desensitization may be desirable if a subsequent recording operation is to be performed and can be brought about rapidly by the action of the heated wire helix 66. Special dye compounds fall within the category of special coating or impregnating materials but since the provision of the record sheet forms no part of the present invention, they will not be further designated nor discussed.

While there is illustrated herein, by way of example, an arrangement for sensitizing by a fluid, it will be understood that desensitization and, if desired, fixation or other chemical or physical modification also may be accomplished in accordance with the invention by means of a fluid applied in the manner shown for applying a sensitizing fluid except that the process shall follow rather than precede the sensitizing process. In the illustrative example of Fig. 1, desensitization is accomplished by the localized application of heat. The means for accomplishing the heat application may be replaced by a mobile orifice similar to the orifice provided in Fig. 1 at the intersection of the slot 52 and the helical slot 64, or other appropriately formed adjacent slits in otherwise continuous surfaces.

Fig. 5 of the drawings shows a slightly modified form of recorder involving the invention which will provide for complete line sensitization of the strip 28 in place of minute area treatment obtainable with the preferred form of the machine 10 described in detail above. The arrangement of the modified machine of Fig. 5 may be generally the same as that of the machine 10 and therefore, many of the identical parts are omitted from the showing of Fig. 5 for the sake of convenience of illustration and description. Similar parts which are included in the showing of Fig. 5 are designated by the same reference characters used in conjunction with Figs. 1 to 4 with the added suffix "*a*." The inner cylinder or fluid container is shown fragmentarily in section and is designated by reference character 34*a*. This part 34*a* is fixed to shafts 31*a* and 32*a* which rotatably support a drum 91. So far as the recording function is concerned the drum 91 corresponds to the drum 12 of Figs. 1 to 4 of the drawings. The drum 91 is driven from a gear 44*a* through a pinion 45*a* which is integral with or secured to the hub 46*a* of the drum 91. Mounted on the drum 91 is a recording helical electrode 14*a* which cooperates with a printer bar 16*a*. Substantially the entire periphery of the drum 91 is more or less uniformly perforated as indicated by reference character 93 so that fluid may be projected through a line or several adjacent lines of these projections onto a record sheet similar to the sheet 28 of Fig. 4 from a slot 52*a* in the inner member 34*a*. This slot may correspond in all respects to the slot 52 of Figs. 1 to 4. The angular position of the inner member 34*a* may be set so that the slot 52*a* lies slightly in advance of the printer bar with respect to the direction of travel of the record sheet.

The length of the sensitized line which is produced on the record sheet will depend on the axial portion of the drum 91 which is perforated. Desensitization or drying may be obtained as in Figs. 1 to 4. Also, desensitization or drying may be permitted to occur by natural evaporation or by the use of a separate heating element spaced from the recording region. It is believed that operation of the modification of Fig. 5 with respect to projection of the fluid supplied through the slot and the perforations 93 and its effect on the recording sheet will be understood from the foregoing complete description of the operation of Figs. 1 to 4.

The improved recording methods discussed above and the novel apparatus disclosed herein, which may be employed in the practice of these methods, provides among other general advantages the following: There is an absence of electrolytic smear; rapid sensitization of the record receiving medium is produced; rapid desensitization of the record receiving medium following almost immediately upon production of the mark if desired is obtained; distortion or warping of the record receiving medium is substantially eliminated; application of a processing fluid such as a vapor at high temperature and under high pressure is obtained; and controllable localized action in the recording region is attained.

Having now described the invention, what is claimed and desired to be secured by Letters Patent is the following:

1. In a recorder, recording means providing for recording in an elemental area of a record receiving member, means for producing relative scanning movement between the recording means and the record receiving member, a mobile nozzle having an orifice of substantially capillary dimensions, means to supply a sensitizing vapor for projection through said nozzle upon said record receiving member in elemental areas thereof, means operable in successive elemental areas of the record receiving member to desensitize the same, and means to correlate the elemental area recording operation of the recording means, the fluid projection function, the mobile nozzle, and the desensitizing operation of the desensitizing means.

2. In a recorder, recording means providing for recording in successive elemental areas of a record receiving member, means for producing relative scanning movement between the recording means and the record receiving member, means for applying a desensitization effect to successive elemental areas of the record receiving member, and means to correlate the successive elemental area recording operation of the recording means with the elemental area operation of the desensitization means so that for a given elemental area desensitization succeeds recording throughout the scanning operation produced by the relative scanning movement.

3. In a recorder, recording means providing for recording in an elemental area of a record receiving member, means for producing relative scanning movement between the recording means and the record receiving member, a pair of members, one having relative movement to provide a mobile nozzle, means to supply fluid for projection through said nozzle, and means to correlate the elemental area recording operation of the recording means and the mobile nozzle.

4. In a recorder for obtaining a record on a record receiving member, means providing for recording in an elemental area of a record receiving member, means for producing relative scanning movement between the recording means and the record receiving member, means to provide sensitization of the record receiving member prior to operation thereon by the recording means, a mobile nozzle having an orifice of substantially capillary dimensions, means to supply a desensitizing fluid for projection through said orifice and means for correlating the successive operation of the recording means and the desensitizing nozzle on the record receiving member.

5. In a recorder, recording means providing a traveling recording point, means for producing relative scanning movement between the traveling recording point and a recording member, nested members having rotary movement with respect to each other, a mobile nozzle formed by the systematic interaction of suitably shaped and intersecting slits, one in each of said nested members, means to supply vapor under pressure to said nozzle, and means to correlate the movement of the recording point and the mobile nozzle.

6. A recorder for recording signals electrically in facsimile comprising an extended linear recording electrode, a cylindrical member having a helical electrode thereon for cooperation with said extended linear electrode, the cylinder having a helical slot in the wall thereof, a drum member having a fluid receiving cavity, an axial slot formed in the wall of said drum, said cylinder and said drum being nested with at least a portion of the wall of said drum having said slot disposed against the inner wall of said cylinder in fluid tight relationship, means to produce relative movement between said cylinder and said drum, and means to produce pressure on a fluid in said cavity whereby the fluid is projected through the movable orifice provided at the intersection of said helical slot and said linear slot as a result of the relative rotary movement of the said cylinder and said drum the fluid facilitating cooperative action of said extended linear recording electrodes and said helical electrode.

7. A recorder for recording signals electrically in facsimile comprising an external linear recording electrode, a cylindrical member having a helical electrode thereon for cooperating with said extended linear electrode, the cylinder having a helical slot in the wall thereof, a drum member having a fluid receiving cavity, an axial slot formed in the wall of said drum, said cylinder and said drum being nested with at least a portion of the wall of said drum having said slot disposed against the inner wall of said cylinder in fluid tight relationship, means for rotating the cylinder, and a heating device disposed in said cavity to heat a fluid in said cavity to produce presure in said fluid to project it through the movable orifice provided at the intersection of said helical slot and said linear slot as said cylinder is rotated with respect to said drum the fluid facilitating cooperative action of said extended linear recording electrodes and said helical electrode.

8. A recorder of the type comprising a rotary cylinder provided with a helical recording electrode and an extended linear recording electrode to cooperate with said helical electrode for recording signals electrically in facsimile on a traveling record receiving sheet, a heater for treating the sheet in the minute areas acted on successively by cooperation of the helical and elongated recording electrodes, said heater comprising a helical heating element disposed to be substantially parallel to said helical recording electrode on said cylinder.

9. A recorder for recording signals electrically in facsimile comprising an extended linear recording electrode, a cylindrical member having a helical electrode thereon for cooperating with said extended linear electrode, the cylinder having a helical slot in the wall thereof, a heating member exposed on the surface of said cylinder in substantially parallel relationship to said helical recording electrode, a drum member having a fluid receiving cavity and an axial slot formed in the wall of said drum, said cylinder and said drum being nested with at least a portion of the wall of said drum having said slot disposed against the inner wall of said cylinder in fluid tight relationship, and means to produce pressure in a fluid in said cavity whereby the fluid is projected through the movable orifice provided on the intersection of said helical slot and said axial slot as said sylinder is rotated with respect to said drum the fluid facilitating cooperative action of said extended linear recording electrodes and said helical electrode.

10. In a recorder of the type comprising a rotary cylinder provided with a helical recording electrode and an extended linear recording electrode to cooperate with said helical electrode for recording signals electrically in facsimile on a traveling record receiving sheet, the combination of a heater for treating the sheet in the minute areas acted on successively by cooperation of the helical and extended linear recording electrodes, said heater comprising an electrical heating element, said cylinder having a helical groove in its periphery in which said heating element is seated, and means adjacent the ends of said element for supplying heating current to said element.

11. In a recorder having recording means providing for recording in an elemental area of a record receiving member and means for producing relative scanning movement between the recording means and the record receiving member, the combination of a pair of members, one having relative movement to provide a mobile nozzle, means to supply fluid for projection through said nozzle, one of said members being angularly movable to determine the path of travel of said mobile nozzle, and angularly movable indicating means for indicating the path of travel of said nozzle.

12. A recorder for recording signals electrically in facsimile comprising an extended linear recording electrode, a cylindrical member having a helical electrode thereon for cooperating with said extended linear electrode, the cylinder having a helical slot in the wall thereof, a drum member having a fluid receiving cavity, an axial slot formed in the wall of said drum, said cylinder and said drum being nested with the helical and axial slots cooperating to provide a moving orifice to provide for projecting a fluid to facilitate cooperative action of said extended electrode and said helical electrode, said drum being movable to determine the path of travel of said moving orifice, and indicating means for indicating the position of said drum.

13. A recorder for recording signals electrically in facsimile comprising a cylindrical member, the cylindrical wall of which is provided with closely spaced perforations, a helical recording member on said cylinder, a drum member having a fluid receiving cavity, an axial slot formed in the wall of said drum, said cylinder and said drum being nested with at least the portion of the wall of said drum having said slot being disposed against the inner perforated wall of said cylinder in fluid tight relationship, and an extended linear recording electrode to cooperate with said helical electrode to provide for recording.

ALFRED N. GOLDSMITH.

REFERENCES CITED

The following references are of record in the file of this patent:

UNITED STATES PATENTS

| Number | Name | Date |
|---|---|---|
| 738,480 | Pollak | Sept. 8, 1903 |
| 1,598,739 | Mettler | Sept. 7, 1926 |
| 1,770,493 | Ranger | July 15, 1930 |
| 1,819,264 | Ranger et al. | Aug. 18, 1931 |
| 1,941,001 | Hansell | Dec. 26, 1933 |
| 2,181,533 | Kline et al. | Nov. 28, 1939 |
| 2,391,763 | Blain | Dec. 25, 1945 |
| 2,415,229 | Young | Feb. 4, 1947 |
| 2,434,531 | Wilson et al. | Jan. 13, 1948 |